| United States Patent [19] | [11] | 4,377,557 |
|---|---|---|
| Lowell | [45] | Mar. 22, 1983 |

[54] PROCESS FOR REMOVAL OF SULFUR OXIDES FROM WASTE GASES

[75] Inventor: Philip S. Lowell, Austin, Tex.

[73] Assignee: Koppers Company, Inc., Pittsburgh, Pa.

[21] Appl. No.: 323,898

[22] Filed: Nov. 23, 1981

[51] Int. Cl.³ .............................................. C01B 17/00
[52] U.S. Cl. .................................... 423/242; 423/166; 423/512 A
[58] Field of Search .......... 423/242 A, 242 R, 244 A, 423/244 R, 166, 512 A, 279

[56] References Cited

U.S. PATENT DOCUMENTS

| 2,196,004 | 4/1940 | Bacon et al. ........................ 23/178 |
| 3,873,532 | 3/1975 | Dahlstrom et al. ................. 423/242 |
| 4,146,569 | 3/1979 | Giammarco ....................... 423/222 |

OTHER PUBLICATIONS

Proceedings: Symposium on Flue Gas Desulfurization, Nov. 1974, pp. 453, 455.

Primary Examiner—O. R. Vertiz
Assistant Examiner—Gregory A. Heller
Attorney, Agent, or Firm—Donald M. MacKay; Herbert J. Zeh, Jr.

[57] ABSTRACT

A process for removing sulfur dioxide from waste gas is provided. The gas is first contacted with an alkaline scrubbing liquor consisting essentially of a sorbent salt in which the cation is sodium or potassium, and one of the anions is borate. The clean gas is vented and the sorbent liquor regenerated for recycle by treatment with lime to precipitate insoluble calcium-sulfur compounds for disposal and regenerate the alkalinity of the scrubbing liquor.

16 Claims, 1 Drawing Figure

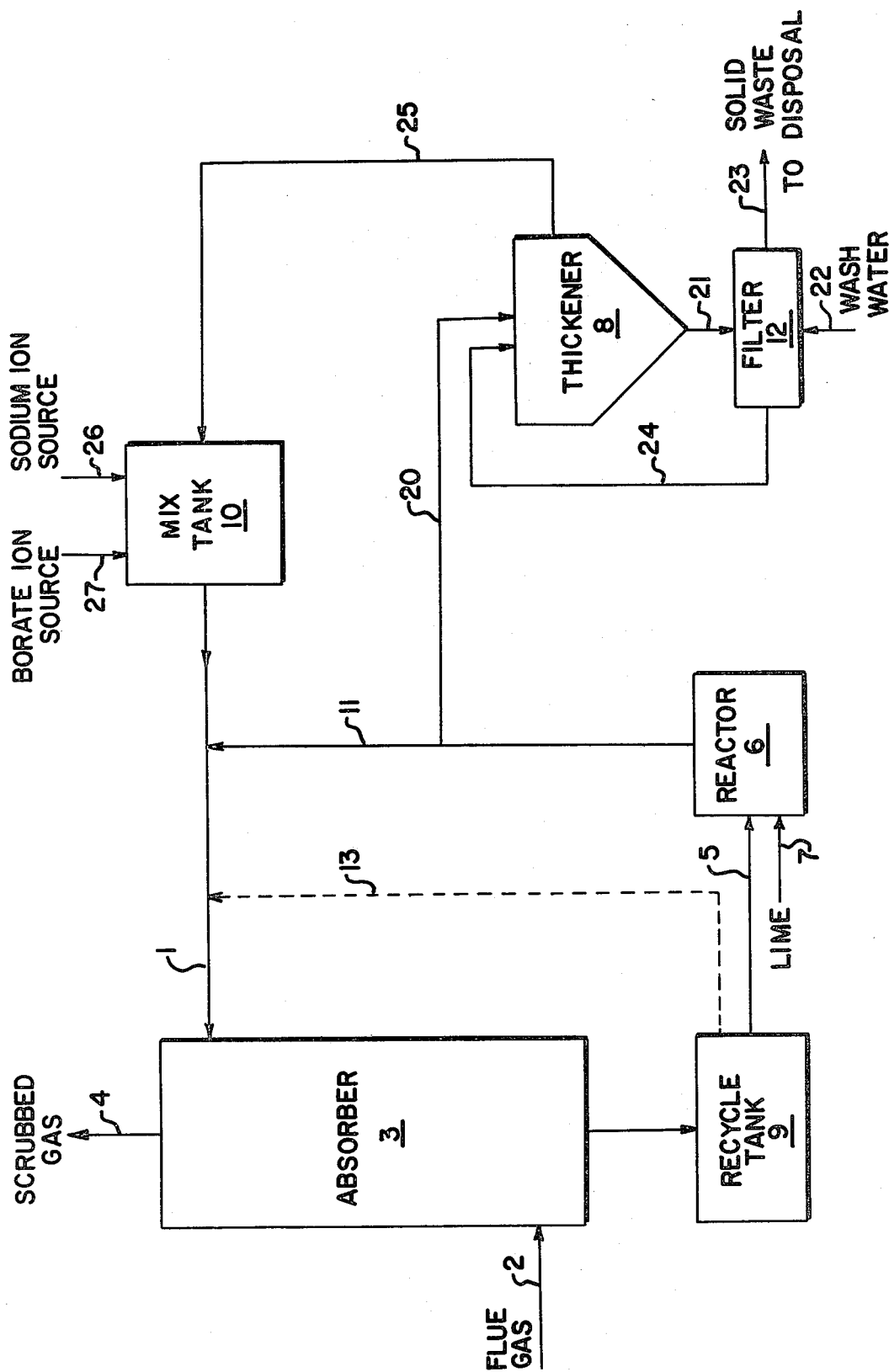

PROCESS FOR REMOVAL OF SULFUR OXIDES FROM WASTE GASES

BACKGROUND OF THE INVENTION

This invention relates to a process for absorbing sulfur oxides from industrial waste gases with a sorbent containing scrubbing liquor and regenerating the sorbent for reuse.

In the combustion of fossil fuels, and in many industrial processes, a serious problem is presented by the combustion of the sulfur-containing components therein. The noxious sulfur oxides produced are an environmental pollutant and in recent years considerable effort has been made to remove the sulfur oxides from the combustion gasses exhausted to the atmosphere. Several methods for removing such oxides are known. One of the processes presently used is wet lime scrubbing. This can either be a slurry process or the so-called dual alkali process. Both of these processes were described at the Environmental Protection Agency sponsored Symposium on Flue Gas Desulfurization, Oct. 28-31, 1980, Houston, Tex.

In some of the existing processes, e.g., the dual alkali process, the sulfite ion is an alkalinity carrier. While oxidation of the sulfite ion to sulfate improves the waste product characteristics, it is detrimental to the $SO_2$ removal capability. The process of the invention overcomes this difficulty, as well as making several other improvements.

BRIEF SUMMARY OF THE INVENTION

Briefly, the process of the invention comprises treating the waste gas containing sulfur oxides (which is principally and hereinafter for convenience referred to as sulfur dioxide) with an alkaline aqueous scrubbing liquor consisting essentially of a sorbent salt in which the cation is sodium or potassium and the anions include borate in an amount sufficient to react with substantially all of the sulfur dioxide present. Other than the borate ion, the particular anion employed is of little significance as this is an acid base reaction and the anion does not take place in the reaction. Where the anion is a weak base such as carbonate, bicarbonate or sulfite, the excess of borate ion renders the contribution of the other anions to $SO_2$ removal insignificant. Typical anions other than borate include hyroxide, sulfate, chloride, carbonate, bicarbonate, sulfite, bisulfite and mixtures. Generally, an amount between about 0.05 and about 2 molal borate ion (moles of solute ion per 1000 grams of solvent) will be sufficient, and preferably between about 0.1 and 0.6 molal.

The borate ion [$(B(OH)_4^-)$], an alkaline species, reacts with dissolved sulfur dioxide to form unionized boric acid.

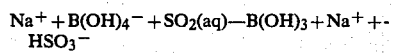

The flue gas, substantially free of sulfur dioxide, is then vented to the atmosphere and the spent sorbent liquor is regenerated with lime. The lime converts the unionized boric acid to borate ion and precipitates the sulfur dioxide as insoluble calcium salts:

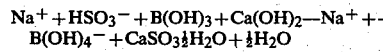

Some of the sulfur in the plus four oxidation state is oxidized to the plus six oxidation state.

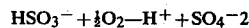

A calcium sulfate waste is produced as a result of this. After separation of the waste solids the sorbent liquor is recycled for treating waste gas.

From the above reaction it may be seen that the sodium cation, $Na^+$, does not enter into the reaction. Potassium would suffice equally as well. The sodium ion is required for electrical neutrality of the solution.

In previous lime based processes, the alkalinity for $SO_2$ removal was provided by the sulfite ion, $SO_3^{-2}$. The presence of borate ion, however, in accordance with the invention, permits the liquid-to-gas ratio to be decreased because it provides additional alkalinity for $SO_2$ removal. Further, a high degree of oxidation of sulfite to sulfate can be tolerated which produces by-product sulfate solids. These are more easily dewatered so that smaller thickeners can be used and the waste makes a more acceptable landfill. In addition, less makeup chemicals, e.g., soda ash, are required because high sulfite levels are not required for alkalinity and if forced oxidation is used, the water content of the waste solids will be lower and less sodium is lost with the sludge.

BRIEF DESCRIPTION OF THE DRAWING

The drawing is a schematic flow diagram of the process of the invention.

DETAILED DESCRIPTION OF THE INVENTION

Referring to the drawing, a scrubbing liquor or slurry at a pH of about 12 is passed via conduit 1 to absorber 3, which is a gas-liquid contacting device. It may contain trays or packing to provide an increased mass transfer area. A flue gas containing sulfur dioxide is passed to absorber 3 via conduit 2. After treatment, the flue gas, substantially free of sulfur dioxide, is vented to the atmosphere via conduit 4.

The spent liquor at a pH of about 6 is passed via conduit 5 to a regeneration reactor 6 where lime is added via conduit 7. In a preferred embodiment, recycle tank 9 is employed to recycle the spent liquor via conduit 13 to increase the total mass transfer area in the absorber 3. Lime reacts with the dissolved sulfite and sulfate to precipitate calcium sulfite and/or calcium sulfate solids.

To produce a more desirable, predominantly sulfate waste product, an oxygen-containing material such as air can be added to reactor 6. It has been found that between one and two molecules of oxygen are typically required to provide the driving force required to oxidize one molecule of sulfite to sulfate.

All or a portion of the resultant regenerated slurry is then passed from reactor 6 to a solid-liquid separation section, e.g., thickener 8, via conduit 20 and the solid waste product, now in a more concentrated form, is passed via conduit 21 to filter 12. Wash water is added to filter 12 via conduit 22 to remove sodium and borate additives. The washed solid waste is passed to solid waste disposal via conduit 23. The combined wash water and filtrate are passed from filter 12 to the thickener via conduit 24 and the clarified liquid from thickener 8 is passed to mix tank 10 vial conduit 25.

Makeup sodium species, e.g., sodium carbonate, is added to mix tank 10 via conduit 26. If the makeup sodium is sodium sulfate it may be added to reactor 6. Makeup borate is added to mix tank 10 via conduit 27.

In the event a slurry, rather than a predominantly solids-free liquor is used for scrubbing, a substantial portion of the slurry from reactor 6 is passed to absorber 3 via conduit 11.

If HCl is present in the flue gas, the sodium addition must be increased to neutralize the chloride ion which will be absorbed by the scrubbing solution.

$$2HCl + Na_2CO_3 \rightarrow 2NaCl + CO_2(gas) + H_2O$$

The borate ion or "alkalinity carrier" aids by converting the solid phase alkalinity of the lime to liquid phase alkalinity of the borate ion. Solid phase alkalinity is not readily available for $SO_2$ removal while liquid phase alkalinity is.

The borate ion in the circulating solution may be supplied by addition of boric acid, borax, sodium borate, sodium tetraborate, and the like. With the use of the latter compound, sufficient $Na_2CO_3$ should be added at a rate which will neutralize the HCl absorbed from the flue gas and the excess borate ions which will result since $Na_2B_4O_7$ produces four boric acid molecules and only two sodium ions. Thus, one mole of $Na_2CO_3$ per mole of $Na_2B_4O_7$ is required.

The following examples will serve to illustrate the preferred embodiments of the invention.

EXAMPLE I

Flue gas (1,056,600 acfm) at 1 atm pressure and 300° F., containing 420 lb-mole/hr $SO_2$ and 20.3 lb-mole/hr HCl is treated in a packed tower gas-liquid absorber with 2,440 gal/min (liquid-to-gas ratio of 3.0 gal/1000 acf (actual cubic feet) of gas saturated with water at 125° F.) of clear liquor containing 0.4 molal borate ion and additional other dissolved species including sodium, chloride, sulfate, sulfite, carbonate, etc. to remove 95 percent of the $SO_2$ and essentially 100 percent of the HCl from the gas.

The spent liquor is then treated with 430 lb.-mole/hr (100% CaO basis) lime to form insoluble calcium-sulfur compounds. The solids formed are separated and washed to recover dissolved species and sent to disposal. The reclaimed liquor from the separation and washing steps is recycled to the absorber with makeup sodium (e.g., sodium carbonate) and makeup borate (e.g., boric acid) added. The amount of makeup sodium and borate required depends on the effectiveness of the solid-liquid separation and washing steps. With no washing, and a waste sludge suspended solids content of 63 wt. %, the borate makeup rate is 3.3 lb-moles/hr (as $Na_2B_4O_7$), and the sodium makeup rate is 18.5 lb-mole/hr (as $Na_2CO_3$).

Comparison of this example to the additional examples in the following table show the relative effects of the presence of borates and that forced oxidation has no significant impact on the required liquid-to-gas ratio with borates present.

EXAMPLES II–IV

The general procedure of Example I is repeated with the exception that the borate concentration is adjusted from 0.4 to 0 molal as indicated in the following Table I. In Example IV forced oxidation is employed by bubbling air in the reactor to provide two molecules of oxygen for every mole of sulfite desired to be oxidized.

From the data reported, it can be seen that even a minor amount of 0.1 molal borate ion substantially reduces the liquid-to-gas ratio and that forced oxidation has no significant effect.

TABLE I
SUMMARY OF EXAMPLES

| Example | Sulfite Oxidation, % | Suspended Solids in Waste Sludge, Wt % | Liquor Borate Concentration, m | Liquid-to-gas Ratio for 95% $SO_2$ Removal, gal/1000 acf |
|---|---|---|---|---|
| I | 20 | 63 | 0.4 | 3.0 |
| II | 20 | 63 | 0.1 | 7.6 |
| III | 20 | 63 | 0.0 | 19.2 |
| IV | 100* | 79 | 0.4 | 3.2 |

*forced oxidation case

What is claimed is:

1. A method for the removal of sulfur dioxide from industrial waste gas containing same comprising:
   (a) scrubbing said gas with an aqueous alkaline liquor, consisting essentially of a sorbent salt in which the cation is sodium or potassium and borate is one of the anions, in an amount sufficient to react with substantially all of the sulfur dioxide present in said gas;
   (b) venting the resultant waste gas and treating the resultant spent liquor with lime in an amount sufficient to regenerate the scrubbing liquor by precipitating insoluble calcium-sulfur containing salts and regenerating the borate ion; and
   (c) separating the resultant, insoluble waste solids and recycling the sorbent liquor to step (a).

2. The method of claim 1 wherein said spent scrubbing liquor from step (a) is recycled to scrubbing step (a).

3. The method of claim 1 wherein the makeup borate is added in the form of boric acid, sodium tetraborate, sodium borate, or mixtures thereof.

4. The method of claim 1 wherein the cation is sodium.

5. The method of claim 1 wherein the makeup salt to provide the circulating sodium ion is sodium carbonate, bicarbonate, hydroxide, sulfate, sulfite, or mixtures thereof.

6. The method of claim 1 wherein the scrubbing liquor contains between about 0.05 and 2.0 molal borate ion.

7. The method of claim 1 wherein the regenerated liquor pH is about 12 and the effluent pH from step (a) is about 6.

8. The method for the removal of sulfur dioxide from industrial waste gas containing same comprising:
   (a) scrubbing said waste gas with an aqueous alkaline slurry, the liquid portion of the slurry consisting essentially of a sorbent salt in which the cation is sodium or potassium and borate is one of the anions, in an amount sufficient to remove substantially all of the sulfur dioxide present in said gas;
   (b) venting the resultant waste gas and treating the resultant spent slurry with lime in an amount sufficient to regenerate the scrubbing slurry by precipitating insoluble calcium-sulfur containing salts and regenerating the borate ion; and
   (c) separating waste solids from a portion of the slurry and removing said solids from the process and returning the liquid from said portion to the process.

9. The method of claim 1 wherein the spent liquor from step (a) is treated with an oxygen-containing gas to oxidize sulfur to the plus six valence state so that the insoluble calcium-sulfur species will be primarily calcium sulfate.

10. The method of claim 8 wherein the spent slurry from step (a) is treated with an oxygen-containing gas to oxidize sulfur to the plus six valence state so that the insoluble calcium-sulfur species will be primarily calcium sulfate.

11. The method of claim 8 wherein a quantity of said spend scrubbing liquor from step (a) is recycled to scrubbing step (a).

12. The method of claim 8 wherein the makeup borate is added to provide the anion of said slurry in the form of boric acid, sodium tetraborate, sodium borate, or mixtures thereof.

13. The method of claim 8 wherein the cation is sodium.

14. The method of claim 8 wherein the makeup salt to provide the circulating sodium ion of said slurry is sodium carbonate, bicarbonate, hydroxide, sulfate, sulfite, or mixtures thereof.

15. The method of claim 8 wherein the scrubbing liquor contains between about 0.05 and 2.0 molal borate ion.

16. The method of claim 8 wherein the pH of the regenerated liquor from step (c) is about 12 and the effluent pH from step (a) is about 6.

* * * * *